(12) United States Patent
Abbott

(10) Patent No.: US 8,560,021 B2
(45) Date of Patent: Oct. 15, 2013

(54) MOBILE DEVICE INTEGRATION WITH WLAN FUNCTIONALITY

(75) Inventor: Martin Jeffrey Abbott, Flemington, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 112 days.

(21) Appl. No.: 13/196,237

(22) Filed: Aug. 2, 2011

(65) Prior Publication Data

US 2013/0035138 A1  Feb. 7, 2013

(51) Int. Cl.
*H04M 3/00* (2006.01)
*G06F 15/16* (2006.01)

(52) U.S. Cl.
USPC .......................... 455/566; 455/418; 709/218

(58) Field of Classification Search
USPC ............... 455/552.1, 566, 418, 556; 370/331; 709/218
See application file for complete search history.

(56) References Cited

U.S. PATENT DOCUMENTS

| | | | |
|---|---|---|---|
| 2007/0262857 A1* | 11/2007 | Jackson | 340/506 |
| 2008/0057930 A1* | 3/2008 | Matsubara | 455/418 |
| 2008/0113683 A1* | 5/2008 | Paas et al. | 455/552.1 |
| 2008/0310370 A1* | 12/2008 | Kitani | 370/331 |
| 2010/0262928 A1 | 10/2010 | Abbott | |
| 2011/0105187 A1 | 5/2011 | Dobroth et al. | |
| 2011/0111737 A1 | 5/2011 | Abbott et al. | |

* cited by examiner

*Primary Examiner* — Nizar Sivji

(57) ABSTRACT

A graphical user interface for a mobile device presents a primary GUI indicating functions and operations of the mobile device. A WLAN GUI is also presented on the display, indicating connectivity aspects of the mobile device regarding WLANs. The WLAN GUI is immediately accessible directly from the primary GUI as the next presented display in response to user interaction with the primary GUI. An additional WLAN GUI may be presented indicating the WLAN access point which is connected to the mobile device and indicating which WLAN access point is downloading or uploading data to the mobile device.

21 Claims, 6 Drawing Sheets

MOBILE DEVICE INTEGRATION WITH WLAN FUNCTIONALITY

BACKGROUND

The present invention generally relates to mobile devices and, in particular, interfaces which permit users to quickly and easily detect and manage downloading from, uploading to and connections to wireless local area networks (WLAN) available to the mobile device.

In many existing mobile devices, users are required to access multiple screens before having the capability of managing the WLAN connectivity. For example, although a status bar icon may appear within the main screen of the device to indicate the general presence of a WLAN (e.g., WiFi), users are required to move to different screens to check for detection of a specific WLAN and thereafter to activate a setting feature which includes WLAN settings in order to connect to the specific WLAN. As another example, in order for a user to determine to which network his or her mobile device is connected, the user would need to access a WLAN control panel. Also, a user would need to access a WLAN control panel to determine the service set identifiers (SSIDs) associated with a list of networks detected by their mobile device. Furthermore, most users do not have sufficient and convenient management of WLAN settings, such as when the mobile device is downloading.

There is a need for improving the user experience, control, and accessibility of WLAN information and connectivity.

SUMMARY

In one form, the invention provides an interface screen of WLAN (e.g., Wi-Fi) information as part of an on-going process (e.g., a menu notification bar). One or more states of WLAN available networks may be included in the interface screen.

In another form, the invention provides a graphical user interface for a mobile device having a display. A primary GUI is presented on the display, indicating functions and operations of the mobile device. A WLAN GUI is also presented on the display, indicating connectivity aspects of the mobile device regarding WLANs. The WLAN GUI is accessible directly from the primary GUI as the next presented display in response to user interaction with the primary GUI.

In another form, the invention provides a mobile device comprising a display, an antenna circuit for receiving WLAN signals, memory storing executable instructions, and a processor executing the instructions stored in the memory and controlling the display. The processor is connected to the antenna circuit for processing the received WLAN signals. The executable instructions display on the display a primary GUI and a WLAN GUI accessible directly from the primary GUI as the next presented display in response to user interaction with the primary GUI.

In another form, the invention provides a tangible computer readable storage medium having computer executable instructions stored therein and executable by a processor of a computing device having a display. The computer executable instructions comprise instructions for displaying on the display a primary GUI indicating functions and operations of the processor of the computing device. Moreover, the computer executable instructions comprise instructions for displaying on the display a WLAN GUI indicating connectivity aspects of the processor regarding WLANs which are detected by the computing device. The WLAN GUI is accessible directly from the primary GUI as the next presented display in response to user interaction with the primary GUI.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the present invention focus on the continuing need to provide WLAN (e.g., Wi-Fi) information at a mobile device user's fingertips. There is a need to reduce 3G and 4G network data burdens. Judicious use of WLAN networks rather than reliance upon the provider's network tends to benefit the user by minimizing the user's data usage of the provider's network and tends to benefit the provider by making more bandwidth available within the provider's network to more users. By providing the user with a snapshot exposing the user to WLAN information, the user is able to better and more quickly understand and manage the WLAN connectivity and WLAN access points available to the user's mobile device. Making WLAN information more quickly and easily discoverable to the user also allows the user to manage connectivity and control its cost.

Users are continuing to demand clear, complete, and concise information regarding WLAN access points and their connectivity to the user's mobile device. As more and more access points with varying degrees of service (e.g., bandwidth, coverage, accessibility, speed) and security become available, it is desirable to enable the user to quickly and completely manage the WLAN connectivity of their mobile device. For example, it is desirable to provide knowledge of such features as (1) the network, if any, to which the user's mobile device is connected; (2) the available access points; (3) the names of the available access points and their service and security levels; and/or (4) whether the user's mobile device is transmitting via a WLAN access point to which the device is connected.

In some scenarios, embodiments of the invention allow user control of connectivity to a particular WLAN access point. For example, the user can decide that a connected access point will not be used to transmit/receive certain data, such as attachments. Providing the user with a snapshot of WLAN information allows the user to ensure that the user's device is transmitting/receiving via the desired network link.

Figure 1:
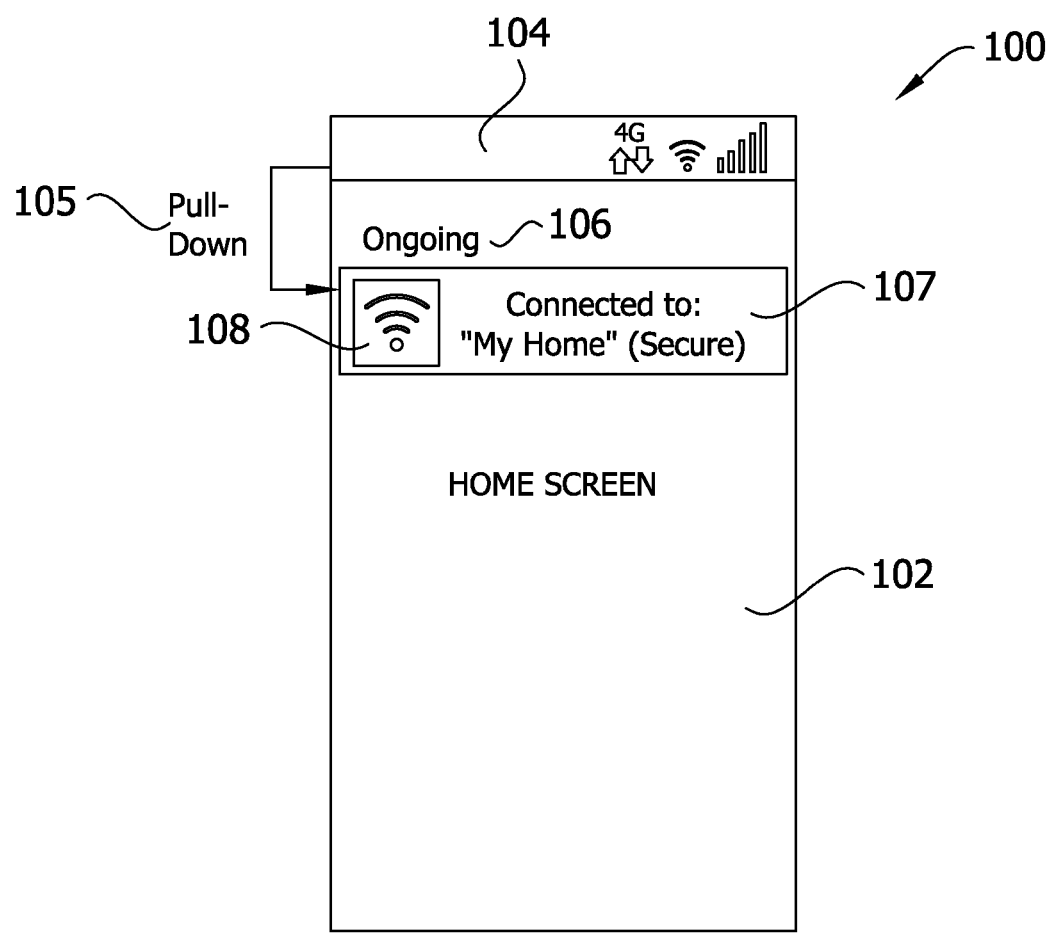
FIG. 1 illustrates a screen shot of one embodiment of the invention providing a graphical user interface in the form of a primary, usually persistent, screen displayed over a home screen which indicates WLAN (e.g., Wi-Fi) status information of a mobile device as a part of the on-going processes menu area of the device.

FIG. 1 illustrates a primary GUI screen 100 of a mobile device of one embodiment of the invention. In this illustration, the primary GUI screen 100 comprises a home screen 102 and has a header 104 (e.g., a status bar) with a pull down menu 105. The pull down menu 105 reveals an on-going process menu area 106 which indicates applications and other processes being executed on the processor of the mobile device. For example, a weather application which is active would be identified in the on-going process menu area 106. The on-going process area 106 provides a graphical user interface (GUI). The GUI is in the form of a WLAN GUI screen area 107 which persists and is displayed over the home screen 102 and which indicates WLAN (e.g., Wi-Fi) status information of a mobile device (see FIG. 5). As used herein, an area that persists is defined as an area that continues to be displayed until deactivated by the user (e.g. through interaction such as "pulling up" the WLAN GUI screen area 107 or selecting a "close" button on the screen) and/or an area that continues to be displayed until a set period of time of at least several seconds has lapsed. By pulling down the menu from the header 104 to reveal the on-going area 106, the status of WLAN connectivity is directly (immediately) available to the user on the WLAN GUI screen area 107. In this embodiment, the user accesses the WLAN GUI screen area 107 directly, rather than via a menu such as a settings menu (e.g., usually available only through a multi-screen process). The WLAN GUI screen area 107 may include an icon 108 illustrating the present state of the WiFi connectivity. In one embodiment, the WLAN GUI screen area 107 may be implemented as a separate designated area (in addition to or instead of being accessible as an ongoing process). For example, it is also contemplated that the WLAN GUI screen area 107 may be accessible from a separate area above a status bar. In general, the WLAN GUI screen area 107 may be accessible from any separate status area of a primary GUI (e.g., home screen 102) of the mobile device. In other embodiments, the user may also access the WLAN GUI screen area 107 in either circumstance—directly or via a settings menu.

For example, one aspect of embodiments of the present invention is directed to assisting the user in managing a WLAN connection. The user may be about to execute a particular application (such as a browser or streaming audio/video) and the user may want to enable the particular application via a particular WLAN access point. Thus, the user can determine WLAN status quickly and efficiently by pulling down the on-going area 106 to immediately get to the WLAN GUI screen area 107 that provides the WLAN information. Thereafter, the user can confirm or control WLAN connectivity before triggering a download/upload session using the particular application via a specific, user-selected access point. The user would employ the WLAN GUI screen area 107 to connect his/her mobile device to the specific access point before triggering the session. Thus, the on-going menu area 106 is indicative of active functions of the mobile device and the WLAN GUI screen area 107 is accessible from the on-going menu area 106 in response to user interaction with the on-going menu area 106. In addition, in one embodiment the WLAN GUI screen area 107 is immediately accessible from a wide variety of (e.g., a majority or even all) screens presented on the mobile device display, and thus the WLAN GUI screen area 107 is able to persist from these screens.

Figure 2:
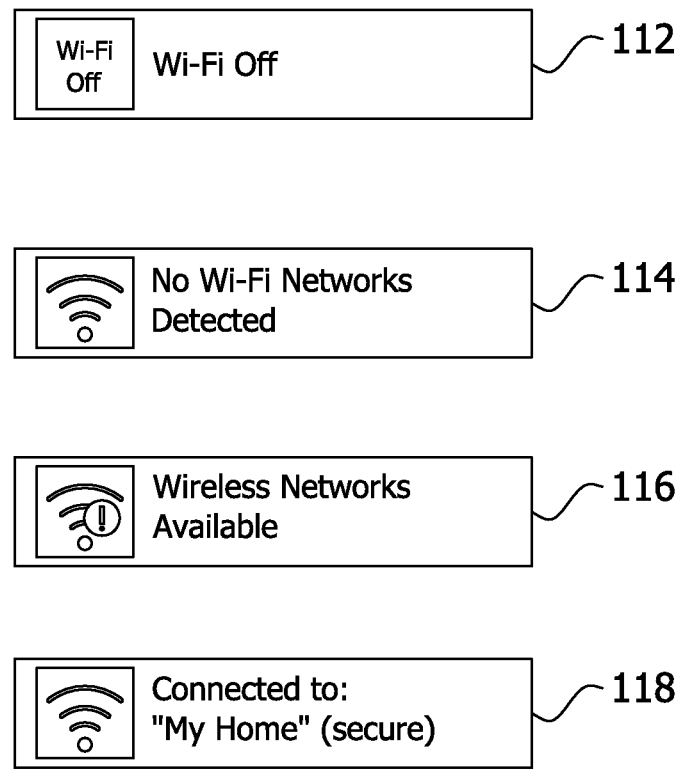
FIG. 2 illustrates various states and information of one embodiment of the invention that may be provided with regard to WLAN connectivity.

FIG. 2 illustrates various states of the on-going area 106 and the information that may be provided with regard to WLAN connectivity and as part of the WLAN status information. For example, one or more of the following may be included as part of the status information: an indicator 112 that the WLAN functionality (e.g., Wi-Fi) has been disabled and turned OFF; an indicator 114 that the WLAN functionality (e.g., Wi-Fi) is ON and no access point has been detected; an indicator 116 that the WLAN functionality (e.g., Wi-Fi) is ON and access points have been detected but not connected; and/or an indicator 118 that the WLAN functionality (e.g., Wi-Fi) is ON and connected to a particular access point, which is identified (e.g., My Home). Alternatively or in addition, the indicator 118 may include a notification of the security level of the connected access point (e.g., open or secure). Other indicators (not illustrated) may include any one or more of the following:

WLAN connectivity ON, access points detected, connected (open; not transmitting);

WLAN connectivity ON, access points detected, connected (secure; not transmitting);

WLAN connectivity ON, access points detected, connected (open; transmitting); and/or WLAN connectivity ON, access points detected, connected (secure; transmitting).

Alternatively or in addition, the mobile device may have the capability of identifying preferred access points. Preferred access points may fall into several categories. For example, a provider may identify an access point as preferred over other access points because the preferred point is provided by an affiliated provider or the preferred point has a high bandwidth. Alternatively, or in addition, a user may identify one access point as preferred over other access points because the preferred point is secure or has a strong signal. Preferred access points may have additional restrictions compared with general access points and include, for example, access point previously identified and/or authenticated by the user and/or access points identified by a provider. If this capability is available, additional indicators (not illustrated) may include any one or more of the following:

a previously identified user-preferred WLAN access point; and/or a provider preferred WLAN access point.

Figure 3:
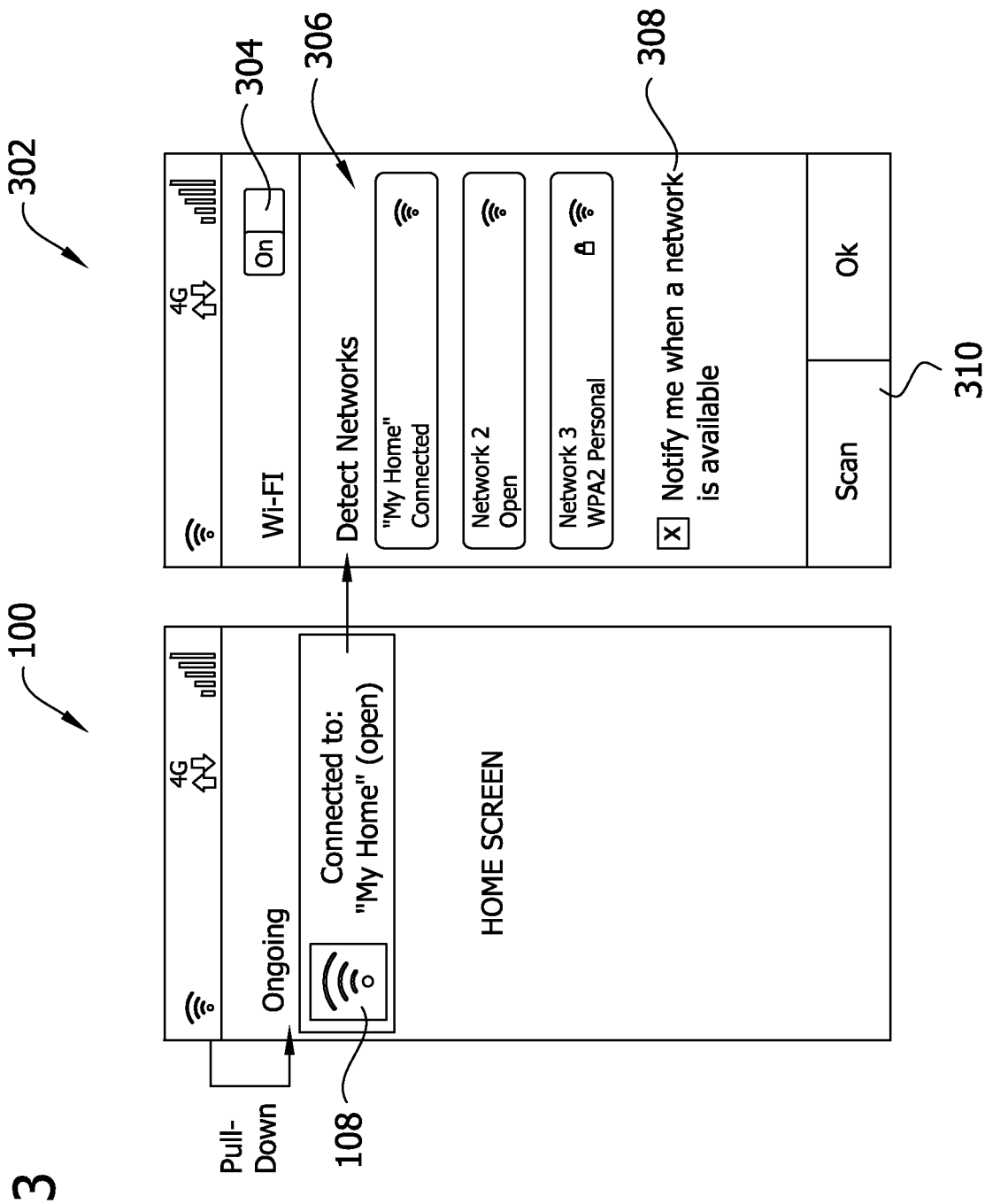
FIG. 3 illustrates successive exemplary screen shots of one embodiment of the invention providing a user interface which indicates an additional screen with more detailed WLAN information as a part of the on-going process menu area of a mobile device.

FIG. 3 illustrates successive screen shots of one embodiment of the invention. The WLAN GUI screen area 107, in response to user interaction, triggers a second GUI screen 302 with more detailed WLAN information as a part of the on-going process menu area of a mobile device. For example, the second GUI screen 302 includes an ON/OFF Wi-Fi (WLAN) indicator 304, a listing 306 of available access points and a notification indicator 308. In one embodiment, buttons 310 are provided to allow the user to scan for access points or to close the screen (e.g., the OK button). In other embodiments, the buttons 310 may not be present; for example, the second GUI screen 302 may be closed via user interaction such as pulling the second GUI screen 302 up and scanning for available access points may occur on a user determined (or predetermined) periodic basis.

As noted above, the mobile device in one or more embodiments has the capability of identifying preferred access points. If this capability is available, the second GUI screen 302 includes symbols, colors or icons (e.g., a gold star, not shown) or the like to identify user-preferred access points and/or provider preferred networks. Also, whether an access point is open or secure may also be illustrated as part of the second GUI screen 302.

Alternatively or in addition, some type of animation of an icon or symbol, or an additional animated symbol such as a blinking dot, may be used to indicate that data transmission/reception is in process.

Figure 5:
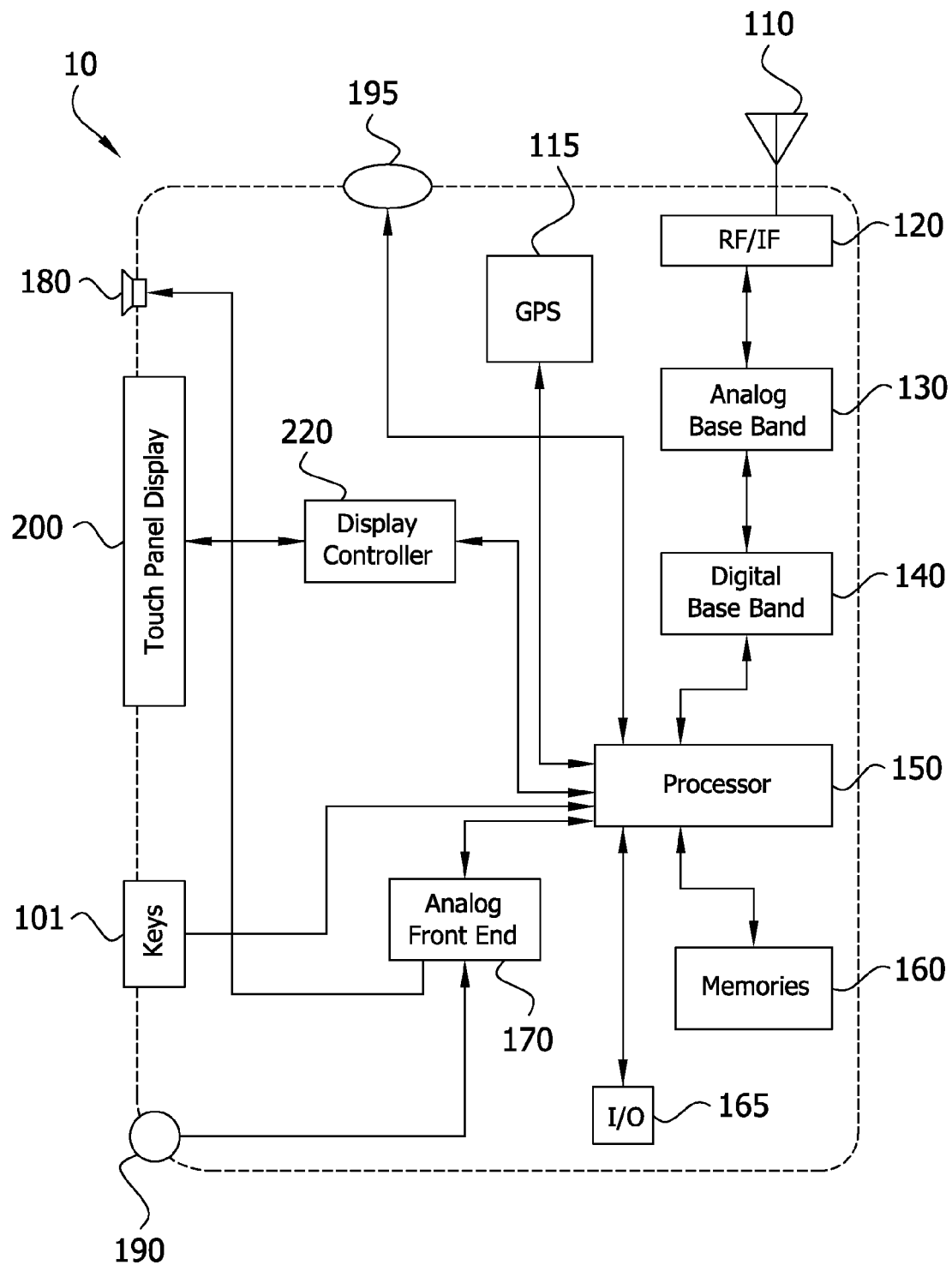
FIG. 5 is an exemplary block diagram of components of a mobile device having a touch panel display for displaying the GUI, states, and screen shots of FIGS. 1-4 according to one embodiment of the invention.

In summary with regard to FIGS. 1-3, the invention in one form comprises a graphical user interface for a mobile device having a display (see FIG. 5). The WLAN GUI screen area 107 is presented on the display, indicating functions and operations of the mobile device. Functions and operations include information regarding any executable program which is a part of the mobile device. Functions and operations do not include setting so that the WLAN GUI screen area 107 is not a settings screen or a settings menu. The GUI screen 302 is presented on the display, indicating connectivity aspects of the mobile device regarding WLANs. In one embodiment, the GUI screen 302 is accessible directly from the WLAN GUI screen area 107 as the next presented display in response to user interaction with the WLAN GUI screen area 107.

Figure 4A:
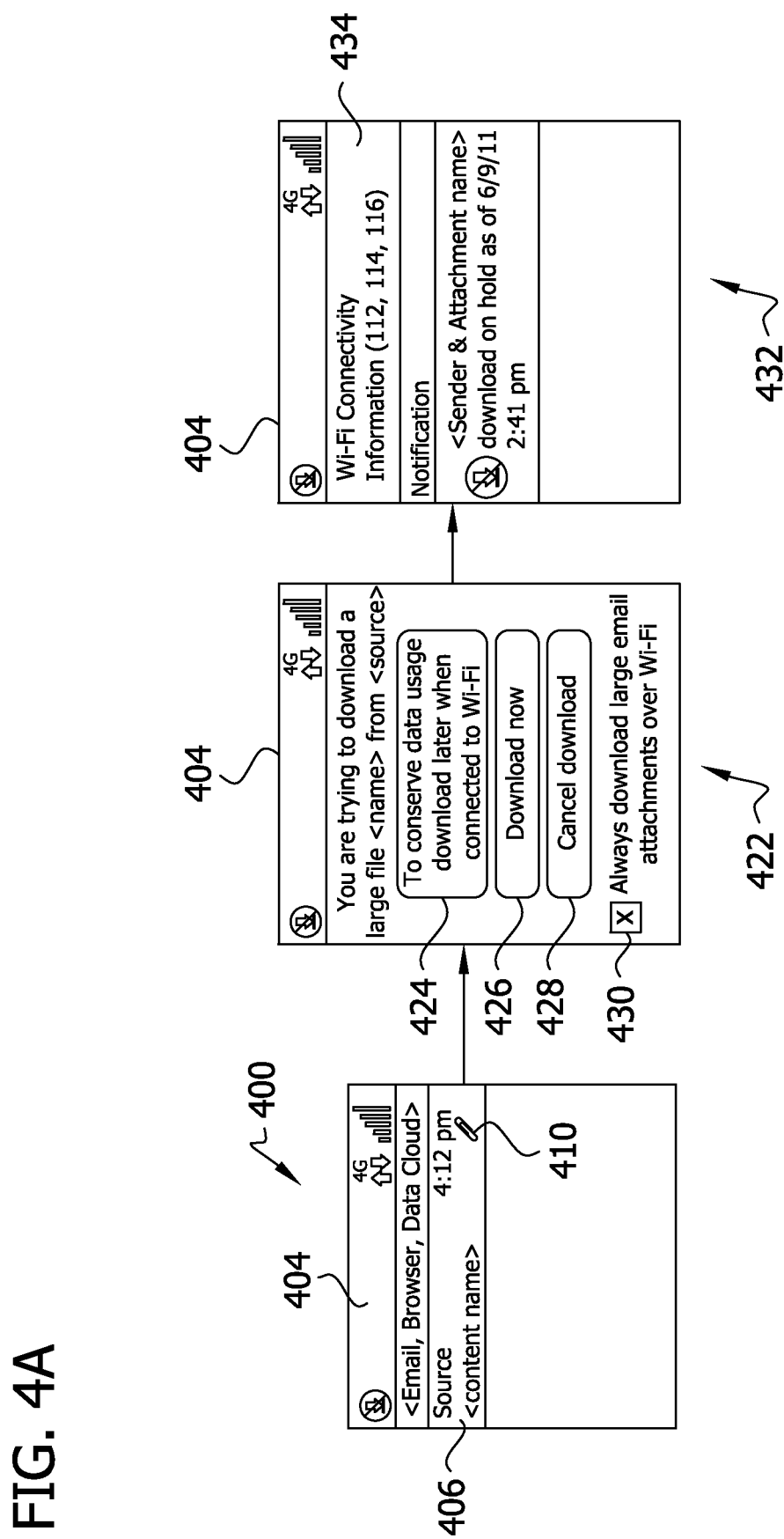
FIG. 4A illustrates successive exemplary screen shots of one embodiment of the invention which may be presented when a user is about to download files over a WLAN and the user's mobile device is not connected to a WLAN.
Figure 4B:
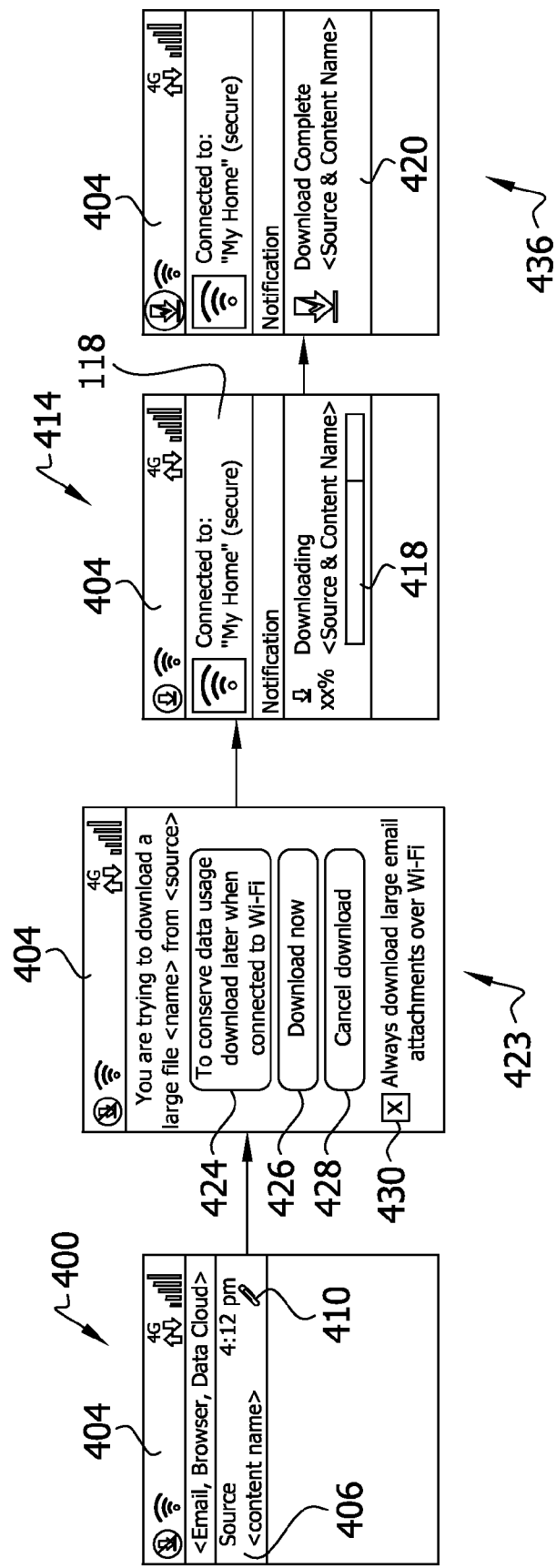
FIG. 4B illustrates successive exemplary screen shots of one embodiment of the invention which may be presented when a user is downloading files over a WLAN and the user's mobile device is connected to a WLAN.

FIGS. 4A and 4B illustrate successive screen shots of one embodiment of the invention which may be presented when a user is downloading files over a WLAN to present downloading connectivity information and/or to present uploading connectivity information. Similar sets of screens (not shown) may be provided for uploading. Alternatively, the screen shots of FIGS. 4A and 4B my include both uploading and downloading connectivity information. The following steps are illustrated.

1. The user selects content from an application source (e.g., e-mail, browser or data cloud) for data transfer to or from the mobile device.
2. If WLAN is connected, the user can view from the on-going drop down menu that the selected file is being downloaded/uploaded over a specified WLAN connection.
3. If WLAN is not connected, the user can choose to select to queue the file for data transfer.
4. The user can then select the notification menu area to connect the WLAN and begin the data transfer.

Aspects of the invention allow the user to see the Wi-Fi status along with the status of the file download/upload simultaneously.

FIG. 4A illustrates successive exemplary additional screens of one embodiment of the invention which may be presented when a user is about to download or upload files over a WLAN and the user's mobile device is not connected to a WLAN. FIG. 4B illustrates successive exemplary additional screens of one embodiment of the invention which may be presented when a user is downloading or uploading files over a WLAN and the user's mobile device is connected to a WLAN.

In this embodiment, the invention comprises a graphical user interface for a mobile device having a display (see FIG. 5). A screen 400 is presented on the display, indicating functions and operations of the mobile device related to data transfer. Screen 400 includes a header 404 that provides the user with access to a source menu 406 indicating available attachments. The header 404 is present in most if not all screens and indicates the status of various operations of the mobile device through the use of icons. At this point, the user has the option to obtain additional detailed information regarding data downloading. For example, the user may select the header 404, such as by touching or dragging, to reveal the source menu 406 to obtain more source information. Next, the user may select an attachment icon 410 in the source menu 406 to obtain information about the status and connectivity of the download.

In response to a user request selecting the attachment icon 410 for more information regarding data downloading, the processor of the mobile device determines whether it is connected to a Wi-Fi access point. If the mobile device is not connected to a WLAN as illustrated in FIG. 4A, a screen 422 is provided. In one embodiment, screen 422 includes a notification of the following options that are user-selectable: an option 424 to hold the download of the item until a WLAN connection is made; an option 426 to download the item using the non-WLAN connection through which the device is connected to the network; an option 428 to cancel the download of the item; and/or an optional setting 430 to always download (or upload) large email attachments (e.g., 1 MB or more) over a WLAN connection. Alternatively or in addition, the user may have the option to always download (or upload) all email attachments. A confirming screen may be displayed to confirm a user selection.

If the user selects option 424 or option 426, screen 432 is displayed to confirm the selection and provide WiFi connectivity information at 434. Since the mobile device is not connected to WiFi, the connectivity information may include one of the following indicators (see FIG. 2): indicator 112 that the WLAN functionality (e.g., Wi-Fi) has been disabled and turned OFF; indicator 114 that the WLAN functionality (e.g., Wi-Fi) is ON and no access point has been detected; or indicator 116 that the WLAN functionality (e.g., Wi-Fi) is ON and access points have been detected but not connected. If the user selects option 428, no further screens need be presented and the user may be returned to a previous screen. If the user previously selected option 430, screen 422 may not be presented and instead screen 432 may instead be presented next, after screen 400.

If more than one WLAN is available (as indicated by the plural "wireless networks available" displayed as indicator 116), the user may pull down the source menu from the header 404 to reveal the available access points (see GUI screen 302 in FIG. 3).

In another embodiment, the mobile device may be configured to automatically start a download (or upload) when a WLAN is available, in which case when multiple WLANs are available at the point the attachment currently on hold is received, the WLAN to which the mobile device is currently connected may be selected as the default without giving the user the option to change WLANs.

In response to a user request selecting the attachment icon 410 for more information regarding data downloading, and in response to the processor of the mobile device determining it is connected to a Wi-Fi access point, screen 423 as illustrated in FIG. 4B is presented. If option 424 or 426 is selected, a WLAN GUI 414 is automatically presented next on the display. Screen 414 includes the indicator 118 of FIG. 2 indicating that the WLAN access point is connected to the mobile device. WLAN GUI 414 also indicates through an icon, such as bar 418, and a number indicating a percentage of the file downloaded that the access point is downloading data to the mobile device as well as download information such as the source and file name, or screen 436 is presented indicating at 420 that downloading is complete. On screen 436, selecting the download button opens the content. If the user previously selected option 430 indicating that large attachments should always be downloaded, and if the user selects the attachment icon 410, screen 414 may be displayed next after screen 400 and screen 422 may be bypassed and not presented.

FIG. 5 is an exemplary block diagram of components of a mobile device having a touch panel display for displaying the GUI, states, and screen shots of FIGS. 1-4 according to one embodiment of the invention. FIG. 5 shows a mobile device 10 having a touch panel display 200. The mobile device 10 comprises keys 101, an RF interface 120 connected to the antenna 110, an analog base band processor 130 and a digital base band processor 140 connected to a processor 150. A display controller or driver 220 is connected to the touch panel display 200 and the processor 150 for controlling the touch panel display 200. An analog front-end processor 170 is connected to the processor 150 and controls the speaker 180 and the microphone 190. The processor controls the display controller 220, RF circuits (120, 130, and 140) and the analog front-end processor 170. The processor 150 also connects to one or more memories 160. The memories 160 may comprise a RAM, a ROM, or a flash memory, and may include a removable memory card. The mobile device 10 may include a camera (still and/or video) 195 to take a picture or a video. The mobile device 10 may further include a GPS (Global Positioning System) receiver 115 for use in locating the position of the mobile device 10. The mobile device 10 may further include an input/output (I/O) terminal 165. The I/O port may be a USB port.

In the embodiment illustrated in FIG. 5, the touch panel display 200 is controlled by the display controller 220, i.e., circuitry. The display controller may detect and respond to the touching of the touch panel display by the user. The display controller may be included in the touch panel display 200 or in the processor 150, and may be any circuitry configured to control outputs on and respond to touching of the touch panel displays 200 and 210. The display controller may also be controlled by the processor 150 and/or software. In the embodiment illustrated, the touch panel displays 200 and 210 are configured to be controlled by the display controller 220, and the display controller 220 is configured to be controlled by the processor 150.

As illustrated in FIG. 5, one embodiment of the invention comprises a mobile device 10 comprising a display 200, 220, an antenna circuit 110, 120, 130, 140 for receiving WLAN signals, memories 160 storing executable instructions, and a processor 150 executing the instructions stored in the memories 160 and controlling the display 200, 220. The processor 150 is connected to the antenna circuit 110, 120, 130, 140 for processing the received WLAN signals. The executable instructions include the various instructions noted herein.

The above mentioned GUI of the present method, system, and device for managing WLAN may be implemented by the mobile device 10 executing one or more computer program instructions stored in a tangible storage medium (memories 160) (e.g., ROM, RAM, or HDD) of the mobile device 10. In particular, the computer executable instructions include: instructions for displaying on the display 200 a primary GUI screen 100 indicating functions and operations of the processor of the computing device; and instructions for displaying on the display 200 a WLAN GUI screen area 107 indicating connectivity aspects of the processor regarding WLANs which are detected by the computing device, the WLAN GUI screen area 107 accessible directly from the primary GUI as the next presented display in response to user interaction with the primary GUI.

In addition, the instructions may include instructions for displaying the primary GUI and instructions for displaying an on-going menu area indicative of active functions of the computing device. The WLAN GUI is accessible from the on-going menu area in response to user interaction with the on-going menu area.

In addition, the instructions may include instructions for displaying the primary GUI include instructions for displaying a home screen including a source menu area indicative of active download or upload functions of the mobile device. The executable instructions for displaying the WLAN GUI include instructions for displaying an additional WLAN GUI accessible from the source menu area in response to user interaction with the source menu area. The additional WLAN GUI indicates the WLAN access point which is connected to the mobile device and indicates which access point, if any, is downloading or uploading data to the mobile device.

In addition, the instructions may include instructions for displaying the primary GUI and instructions for confirming the security level of a WLAN access point prior to the computing device executing an application which contains secure information.

In some mobile device configurations which have both indicators and status bars, it may be necessary or desirable to suppress either the indicator or status bar when implementing a GUI noted herein. For example, when a GUI is part of the on-going process menu area (e.g., a button), the default indicator regarding WLAN may be eliminated. On the other hand, if the GUI is not tied to the on-going process menu area, there may be no need to eliminate any other status indicators.

One of the advantages of the present subject matter of some embodiments of the invention is that it allows a mobile device user to immediately determine and manage the WLAN status of their mobile device by a single action of tapping or selecting the on-going process menu area (e.g., a button and/or a menu bar in the primary GUI) of the device. In one embodiment, the WLAN GUI persists from most screens or any screen presented by the mobile device so that this advantage is available from most screens or any screen.

One embodiment of the invention may be implemented as a method of operating a mobile device having a display. The method includes displaying on a display a primary GUI indicating functions and operations of the mobile device; and displaying on the display a WLAN GUI indicating connectivity aspects of the mobile device regarding WLANs which are detected by the mobile device. The WLAN GUI is accessible directly from the primary GUI as the next presented display in response to user interaction with the primary GUI.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The Abstract of the Disclosure is provided to allow the reader to quickly ascertain the nature of the technical disclosure. It is submitted with the understanding that it will not be used to interpret or limit the scope or meaning of the claims.

What is claimed is:

1. A graphical user interface (GUI) for a mobile device having a display, comprising:
    a primary GUI for presentation on the display, wherein the primary GUI comprises a home screen indicating functions and operations of the mobile device and having a status area including icons indicating a status of operations of the mobile device; and
    a WLAN GUI for presentation on the display, the WLAN GUI indicating connectivity status of the mobile device relative to each WLAN detected by the mobile device, the WLAN GUI accessible directly from the status area of the primary GUI as the next presented display in response to user interaction with the primary GUI; and
    wherein at least one of the following (a), (b) or (c):
        (a) the WLAN GUI includes a first additional screen accessible from a source menu area in response to user interaction with the source menu area, and wherein:
            when the mobile device is not connected to a WLAN, a data item is ready for transfer, and a WLAN is not available, the first additional screen comprises a notification of the following user-selectable options:
                hold transfer of the data item until a WLAN connection is present;
                transfer the data item;
                cancel transfer of the data item; and
                always transfer email attachments over a WLAN connection; and
            when the mobile device is not connected to a WLAN, a data item is ready for transfer, and a WLAN is available, the first additional screen comprises a notification that:
                a WLAN is available; and
                a data item is available for transfer; and
        (b) the WLAN GUI comprises a notification of a plurality of the following states of the WLAN connectivity of the mobile device:
            WLAN connectivity OFF;
            WLAN connectivity ON, no access point detected;
            WLAN connectivity ON, access points detected, not connected;
            WLAN connectivity ON, access points detected, connected to unsecure WLAN;
            WLAN connectivity ON, access points detected, connected to secure WLAN;
            WLAN connectivity ON, access points detected, connected to unsecure WLAN, data not being transferred;
            WLAN connectivity ON, access points detected, connected to secure WLAN, data not being transferred;
            WLAN connectivity ON, access points detected, connected to unsecure WLAN, data being transferred;
            WLAN connectivity ON, access points detected, connected to secure WLAN, data being transferred;
            a previously identified user-preferred WLAN access point; and
            a provider preferred WLAN access point; and
        (c) the primary GUI displays a source menu area indicative of active data transfer functions of the mobile device and wherein the WLAN GUI displays a first additional screen accessible from the source menu area in response to user interaction with the source menu area, and wherein the first additional screen indicates whether a WLAN access point is connected to the mobile device and whether the WLAN access point is downloading or uploading data to the mobile device.

2. The interface of claim 1 wherein the primary GUI includes an on-going menu area indicative of active functions of the mobile device and wherein the WLAN GUI is immediately accessible from the on-going menu area in response to user interaction with the on-going menu area.

3. The interface of claim 1 wherein the primary GUI includes a source menu area indicative of active data transfer functions of the mobile device and wherein the WLAN GUI includes a first additional screen accessible from the source menu area in response to user interaction with the source menu area, and wherein the first additional screen indicates downloading or uploading connectivity information.

4. The interface of claim 1 wherein the WLAN GUI includes a first additional screen accessible from a source menu area in response to user interaction with a source menu area, and wherein:
    when the mobile device is not connected to a WLAN, a data item is ready for transfer, and a WLAN is not available, the first additional screen comprises a notification of the following user-selectable options:
        hold transfer of the data item until a WLAN connection is present;
        transfer the data item;
        cancel transfer of the data item; and
        always transfer email attachments over a WLAN connection; and when the mobile device is not connected to a WLAN, a data item is ready for transfer, and a WLAN is available, the first additional screen comprises a notification that:
a WLAN is available; and
a data item is available for transfer.

5. The interface of claim 1 wherein the WLAN GUI is available by a single action on the display of the mobile device and wherein the status area of the primary GUI exists in all screens presented on the mobile device display and the WLAN GUI is available and persists until deselected by user interaction.

6. The interface of claim 1 wherein the connectivity status indicated by the WLAN GUI includes at least one of the following:
an indication of available WLAN access points;
an indication of a WLAN access point, if any, to which the mobile device is connected;
an indication of whether a preferred WLAN access point is available; and
an indication of available WLAN access points as well as an indication of the security level of the available WLAN access points.

7. The interface of claim 1 wherein the WLAN GUI comprises a notification of a plurality of the following states of the WLAN connectivity of the mobile device:
WLAN connectivity OFF;
WLAN connectivity ON, no access point detected;
WLAN connectivity ON, access points detected, not connected;
WLAN connectivity ON, access points detected, connected to unsecure WLAN;
WLAN connectivity ON, access points detected, connected to secure WLAN;
WLAN connectivity ON, access points detected, connected to unsecure WLAN, data not being transferred;
WLAN connectivity ON, access points detected, connected to secure WLAN, data not being transferred;
WLAN connectivity ON, access points detected, connected to unsecure WLAN, data being transferred;
WLAN connectivity ON, access points detected, connected to secure WLAN, data being transferred;
a previously identified user-preferred WLAN access point; and
a provider preferred WLAN access point.

8. The interface of claim 1 further comprising a source menu available from the status area and additional screens available from the source menu, said additional screens indicating the following:
(a) when the mobile device is not connected to a WLAN and a data item is ready for download or upload, a screen comprising a notification of the following options is provided:
hold download or upload of the item until a WLAN connection;
download or upload the item;
cancel download or upload of the item; and
always download or upload email attachments over a WLAN connection; and/or
(b) when the mobile device is connected to a WLAN, the screen comprises a notification of the following options:
downloading or uploading in process; and
downloading or uploading complete.

9. A mobile device comprising:
a display;
an antenna circuit for receiving WLAN signals;
a memory storing executable instructions; and
a processor executing the instructions stored in the memory and controlling the display, the processor connected to the antenna circuit for processing the received WLAN signals;
the executable instructions comprising:
instructions for displaying on the display a primary GUI indicating functions and operations of the mobile device and having a header including icons indicating a status of operations of the mobile device;
instructions for displaying on the display a WLAN GUI indicating connectivity status of the mobile device relative to WLANs which are received by the antenna and processed by the processor of the mobile device, the WLAN GUI accessible directly from the header of the primary GUI as the next presented display in response to user interaction with the primary GUI; and
wherein at least one of the following (a), (b) or (c):
(a) the instructions for displaying on the display the WLAN GUI include instructions for displaying a first additional screen accessible from a source menu area in response to user interaction with the source menu area, and wherein:
when the mobile device is not connected to a WLAN, a data item is ready for transfer, and a WLAN is not available, the first additional screen comprises a notification of the following user-selectable options:
hold transfer of the data item until a WLAN connection is present;
transfer the data item;
cancel transfer of the data item; and
always transfer email attachments over a WLAN connection; and
when the mobile device is not connected to a WLAN, a data item is ready for transfer, and a WLAN is available, the first additional screen comprises a notification that:
a WLAN is available; and
a data item is available for transfer; and
(b) the instructions for displaying on the display the WLAN GUI comprise instructions for displaying a notification of a plurality of the following states of the WLAN connectivity of the mobile device:
WLAN connectivity OFF;
WLAN connectivity ON, no access point detected;
WLAN connectivity ON, access points detected, not connected;
WLAN connectivity ON, access points detected, connected to unsecure WLAN;
WLAN connectivity ON, access points detected, connected to secure WLAN;
WLAN connectivity ON, access points detected, connected to unsecure WLAN, data not being transferred;
WLAN connectivity ON, access points detected, connected to secure WLAN, data not being transferred;
WLAN connectivity ON, access points detected, connected to unsecure WLAN, data being transferred;
WLAN connectivity ON, access points detected, connected to secure WLAN, data being transferred;
a previously identified user-preferred WLAN access point; and
a provider preferred WLAN access point; and
(c) the instructions for displaying the primary GUI include instructions for displaying a source menu area indicative of active data transfer functions of the mobile device and wherein the instructions for displaying the WLAN GUI include instructions for displaying a first additional screen accessible from the source menu area in response to user interaction with the source menu area, and wherein the first additional screen indicates whether a WLAN access point is connected to the mobile device and whether the WLAN access point is downloading or uploading data to the mobile device.

10. The device of claim 9 wherein the executable instructions for displaying the primary GUI include instructions for displaying an on-going menu area indicative of active functions of the mobile device and wherein the WLAN GUI is accessible from the on-going menu area in response to user interaction with the on-going menu area.

11. The device of claim 10 wherein, when the mobile device is connected to a WLAN, the display of the first additional WLAN GUI comprises a notification that:
   downloading or uploading in process; or
   downloading or uploading complete.

12. The device of claim 9 wherein the executable instructions for displaying the WLAN GUI include instructions for displaying an additional screen accessible from a source menu area in response to user interaction with the source menu area, and wherein:
   when the mobile device is not connected to a WLAN, a data item is ready for transfer, and a WLAN is not available, the additional WLAN GUI comprises a notification of the following user-selectable options:
      hold transfer of the data item until a WLAN connection is present;
      transfer the data item;
      cancel transfer of the data item; and
      always transfer email attachments over a WLAN connection; and
   when the mobile device is not connected to a WLAN, a data item is ready for transfer, and a WLAN is available, the additional WLAN GUI comprises a notification that:
      a WLAN is available; and
      a data item is available for transfer.

13. The device of claim 9 wherein the WLAN GUI is available by a single action on the display of the mobile device and wherein the WLAN GUI is available and persists from a header of all screens on the display.

14. The device of claim 9 wherein the connectivity status indicated by the WLAN GUI includes at least one of the following:
   an indication of available WLAN access points;
   an indication of a WLAN access point, if any, to which the mobile device is connected;
   an indication of whether a preferred WLAN access point is available; and
   an indication of available WLAN access points as well as an indication of the security level of a WLAN access point.

15. The device of claim 9 wherein the WLAN GUI comprises a notification of the following states of the WLAN connectivity of the mobile device:
   WLAN connectivity OFF;
   WLAN connectivity ON, no access point detected;
   WLAN connectivity ON, access points detected, not connected;
   WLAN connectivity ON, access points detected, connected to unsecure WLAN;
   WLAN connectivity ON, access points detected, connected to secure WLAN;
   WLAN connectivity ON, access points detected, connected to unsecure WLAN, data not being transferred;
   WLAN connectivity ON, access points detected, connected to secure WLAN, data not being transferred;
   WLAN connectivity ON, access points detected, connected to unsecure WLAN, data being transferred;
   WLAN connectivity ON, access points detected, connected to secure WLAN, data being transferred;
   a previously identified user-preferred WLAN access point; and
   a provider preferred WLAN access point.

16. A tangible computer readable storage medium having computer executable instructions stored therein and executable by a processor of a computing device having a display, the computer executable instructions comprising:
   instructions for displaying on the display a primary GUI indicating functions and operations of the processor of the computing device and having a status area including icons indicating a status of operations of the computing device; and
   instructions for displaying on the display a WLAN GUI indicating connectivity status of the processor relative to WLANs which are detected by the computing device, the WLAN GUI accessible directly from the status area of the primary GUI as the next presented display in response to user interaction with the primary GUI; and
wherein at least one of the following (a), (b) or (c):
   (a) the instructions for displaying on the display the WLAN GUI include instructions for displaying a first additional screen accessible from a source menu area in response to user interaction with the source menu area, and wherein:
      when the mobile device is not connected to a WLAN, a data item is ready for transfer, and a WLAN is not available, the first additional screen comprises a notification of the following user-selectable options:
         hold transfer of the data item until a WLAN connection is present;
         transfer the data item;
         cancel transfer of the data item; and
         always transfer email attachments over a WLAN connection; and
      when the mobile device is not connected to a WLAN, a data item is ready for transfer, and a WLAN is available, the first additional screen comprises a notification that:
         a WLAN is available; and
         a data item is available for transfer; and
   (b) the instructions for displaying on the display the WLAN GUI comprise instructions for displaying a notification of a plurality of the following states of the WLAN connectivity of the mobile device:
      WLAN connectivity OFF;
      WLAN connectivity ON, no access point detected;
      WLAN connectivity ON, access points detected, not connected;
      WLAN connectivity ON, access points detected, connected to unsecure WLAN;
      WLAN connectivity ON, access points detected, connected to secure WLAN;
      WLAN connectivity ON, access points detected, connected to unsecure WLAN, data not being transferred;
      WLAN connectivity ON, access points detected, connected to secure WLAN, data not being transferred;
      WLAN connectivity ON, access points detected, connected to unsecure WLAN, data being transferred;
      WLAN connectivity ON, access points detected, connected to secure WLAN, data being transferred;
      a previously identified user-preferred WLAN access point; and
      a provider preferred WLAN access point; and
   (c) the instructions for displaying the primary GUI include instructions for displaying a source menu area indicative of active data transfer functions of the mobile device and wherein the instructions for displaying the WLAN GUI include instructions for displaying a first additional screen accessible from the source menu area in response to user interaction with the source menu area, and wherein the first additional screen indicates whether a WLAN access point is connected to the mobile device and whether the WLAN access point is downloading or uploading data to the mobile device.

17. The storage medium of claim 16 wherein the computer executable instructions for displaying the primary GUI include instructions for displaying an on-going menu area indicative of active functions of the computing device and wherein the WLAN GUI is accessible from the on-going menu area in response to user interaction with the on-going menu area.

18. The storage medium of claim 16 wherein the executable instructions for displaying the primary GUI include instructions for displaying a source menu area indicative of active data transfer functions of the mobile device and wherein the executable instructions for displaying the WLAN GUI include instructions for displaying a first additional screen accessible from the source menu area in response to user interaction with the source menu area, and wherein the first additional screen indicates whether a WLAN access point is connected to the mobile device and whether the WLAN access point is downloading or uploading data to the mobile device.

19. The storage medium of claim 18 wherein, when the mobile device is connected to a WLAN, the display of the first additional screen comprises a notification that:
 downloading or uploading in process; or
 downloading or uploading complete.

20. The storage medium of claim 16 wherein the WLAN GUI is available by a single action on the display of the computing device and wherein the WLAN GUI is available and persists from a status area of all screens presented on the mobile device display.

21. The storage medium of claim 16 wherein the computer executable instructions for displaying the primary GUI include instructions for confirming the security level of a WLAN access point prior to the computing device executing an application which contains secure information.

* * * * *